United States Patent
Friend et al.

(10) Patent No.: US 9,678,210 B2
(45) Date of Patent: Jun. 13, 2017

(54) ERROR ESTIMATION IN REAL-TIME VISUAL ODOMETRY SYSTEM

(71) Applicant: Caterpillar Inc., Peoria, IL (US)

(72) Inventors: Paul Russell Friend, Morton, IL (US); Hong Chang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 215 days.

(21) Appl. No.: 14/577,440

(22) Filed: Dec. 19, 2014

(65) Prior Publication Data

US 2016/0180530 A1 Jun. 23, 2016

(51) Int. Cl.
| | | |
|---|---|---|
| G01S 17/89 | (2006.01) | |
| G01S 7/48 | (2006.01) | |
| G01S 17/02 | (2006.01) | |
| G01S 17/58 | (2006.01) | |

(52) U.S. Cl.
CPC ............ *G01S 17/89* (2013.01); *G01S 7/4808* (2013.01); *G01S 17/023* (2013.01); *G01S 17/58* (2013.01)

(58) Field of Classification Search
None
See application file for complete search history.

(56) References Cited

U.S. PATENT DOCUMENTS

| | | | | |
|---|---|---|---|---|
| 8,494,225 B2 * | 7/2013 | Center | ................. | G06T 7/0071 348/113 |
| 2011/0153341 A1 | 6/2011 | Diaz-Cortes | | |
| 2011/0169923 A1 * | 7/2011 | Dellaert | ................ | G06T 7/2033 348/47 |
| 2012/0121161 A1 * | 5/2012 | Eade | .................... | G09B 29/007 382/153 |
| 2012/0299702 A1 | 11/2012 | Edara et al. | | |
| 2013/0093852 A1 | 4/2013 | Ye | | |
| 2013/0335528 A1 | 12/2013 | Vishwanath et al. | | |
| 2014/0009748 A1 | 1/2014 | Leonessa et al. | | |
| 2014/0028713 A1 | 1/2014 | Keating et al. | | |
| 2014/0139635 A1 | 5/2014 | Chandraker et al. | | |
| 2014/0316698 A1 * | 10/2014 | Roumeliotis | ........ | G01C 21/165 701/500 |
| 2015/0369609 A1 * | 12/2015 | Roumeliotis | ........ | G01C 21/165 701/532 |

OTHER PUBLICATIONS

Jiang et al. "Performance evaluation of feature detection and matching in stereo visual odometry," Neurocomputing, vol. 120, pp. 380-390, available online Mar. 26, 2013.*

* cited by examiner

*Primary Examiner* — Matthew Bella
*Assistant Examiner* — Soo Shin
(74) *Attorney, Agent, or Firm* — Finnegan, Henderson, Farabow, Garrett & Dunner, LLP

(57) ABSTRACT

A motion determination system is disclosed. The system may calculate one or more visual-odometry outputs. The system may determine a plurality of figure of merits, wherein each of the plurality of figure of merits is associated with one of a plurality of parameters affecting the calculation of the one or more visual-odometry outputs, and each of the plurality of figure of merits is indicative of an accuracy of the visual-odometry outputs. The system may calculate a combined figure of merit based on the plurality of figure of merits. The system may calculate an error estimate for the one or more visual-odometry outputs based on the combined figure of merit.

20 Claims, 8 Drawing Sheets

ERROR ESTIMATION IN REAL-TIME VISUAL ODOMETRY SYSTEM

TECHNICAL FIELD

The present disclosure relates generally to visual odometry techniques and more particularly, to systems and methods for error estimation in real-time visual odometry systems.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. Parameters indicative of machine motion, e.g., velocity and change in position of the machine, are parameters whose accuracy may be important for control of the machine and its operation.

Some exemplary systems determine velocity and change in position based on vision systems, utilizing methods known as visual odometry. For example, an exemplary system that may be used to determine changes in position using visual-odometry techniques is disclosed in U.S. Patent Publication No. 2014-0300732 to Friend et al. that published on Oct. 9, 2014 (the '732 publication). The system of the '732 publication fuses images from a camera and a Light Detection and Ranging (LIDAR), and utilizes these images to determine rotation and translation velocities for a machine.

Although the system of the '732 publication may be useful for determining the rotation and translation velocities of a machine using visual-odometry techniques, the '732 publication does not describe techniques for estimating an error associated with the visual-odometry system outputs (e.g., rotation and translation velocities). Knowing an error estimate associated with the visual-odometry system outputs is desirable because knowledge of the error estimate may allow more accurate determination of a position of the machine. For example, knowledge of an error estimate may allow the fusing of the visual-odometry system outputs with outputs from other sensors, such as an inertial measurement unit.

The disclosed motion determination system is directed to overcoming one or more of the problems set forth above and/or other problems of the prior art.

SUMMARY

In one aspect, the present disclosure is directed to a motion determination system in a machine. The system may include one or more memories storing instructions, and a controller configured to execute the instructions to perform certain operations. The operations may include calculating one or more visual-odometry outputs. The operations may include determining a plurality of figure of merits, wherein each of the plurality of figure of merits is associated with one of a plurality of parameters affecting the calculation of the one or more visual-odometry outputs, and each of the plurality of figure of merits is indicative of an accuracy of the visual-odometry outputs. The operations may further include calculating a combined figure of merit based on the plurality of figure of merits. The operations may further include calculating an error estimate for the one or more visual-odometry outputs based on the combined figure of merit.

In another aspect, the present disclosure is directed to a computer-implemented method for determining motion of a machine. The method may include calculating one or more visual-odometry outputs. The method may further include determining a plurality of figure of merits, wherein each of the plurality of figure of merits is associated with one of a plurality of parameters affecting the calculation of the one or more visual-odometry outputs, and each of the plurality of figure of merits is indicative of an accuracy of the visual-odometry outputs. The method may further include calculating a combined figure of merit based on the plurality of figure of merits. The method may further include calculating an error estimate for the one or more visual-odometry outputs based on the combined figure of merit.

In yet another aspect, the present disclosure is directed to a machine including a range detection unit that generates range data, a camera that generates camera images, and a controller configured to execute instructions to process the range data and the camera images to perform operations. The operations may include calculating one or more visual-odometry outputs. The operations may include determining a plurality of figure of merits, wherein each of the plurality of figure of merits is associated with one of a plurality of parameters affecting the calculation of the one or more visual-odometry outputs, and each of the plurality of figure of merits is indicative of an accuracy of the visual-odometry outputs. The operations may further include calculating a combined figure of merit based on the plurality of figure of merits. The operations may further include calculating an error estimate for the one or more visual-odometry outputs based on the combined figure of merit.

DETAILED DESCRIPTION

Figure 1:
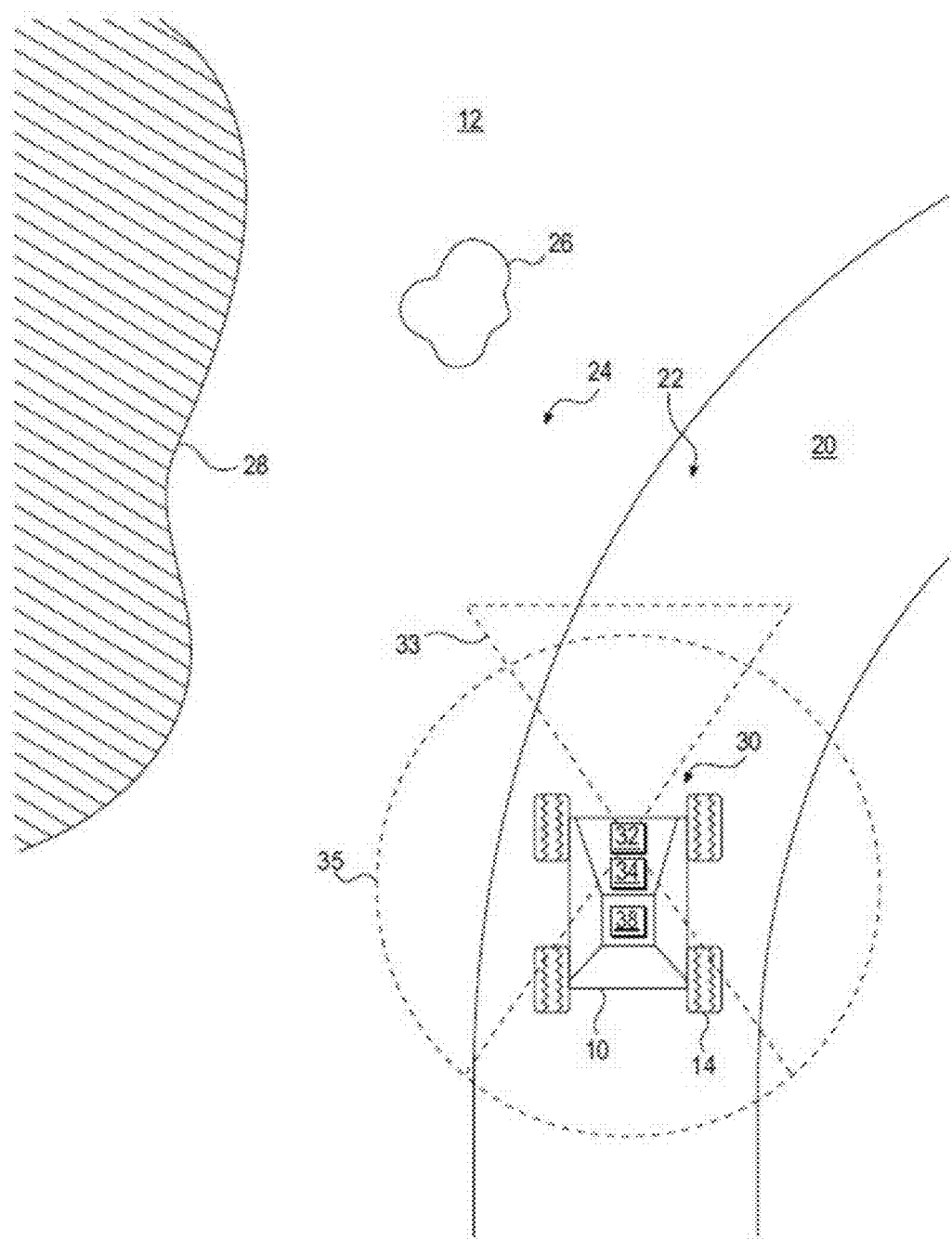
FIG. 1 is a pictorial illustration of an exemplary disclosed work machine on a worksite having an exemplary motion determination system.

FIG. 1 illustrates an exemplary machine 10. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled. Machine 10 may generally include a power source (not shown), at least one traction device 14, and a motion determination system 30 for determining motion of machine 10. The power source may be connected to traction device 14, e.g., by a drivetrain, thereby driving traction device 14 to propel machine 10 within worksite 12. Traction device 14 may include wheels located on each side of machine 10. Alternatively, traction device 14 may include tracks, belts, or other known traction devices.

Worksite 12 may be a mine site or any other type of worksite traversable by machine 10. In some embodiments, worksite 12 may include various features. Features may be any characteristic, quality, and/or object of worksite 12. Exemplary features of worksite 12 may be a road 20, a dirt-covered portion 22 of the ground, a gravel-covered portion 24 of the ground, rocks 26, sidewalls 28 of worksite 12, and any other objects such as work signs, poles, dirt mounds, trees, and/or other machines, etc. or portions of such. Features may have various colors and/or shapes. In some situations, the ground of worksite 12 may be relatively flat. In other situations, the ground of worksite 12 may include variations in the contour of the ground and/or objects that protrude from the surface of the ground, such as rocks 26 or any other objects.

Figure 2:
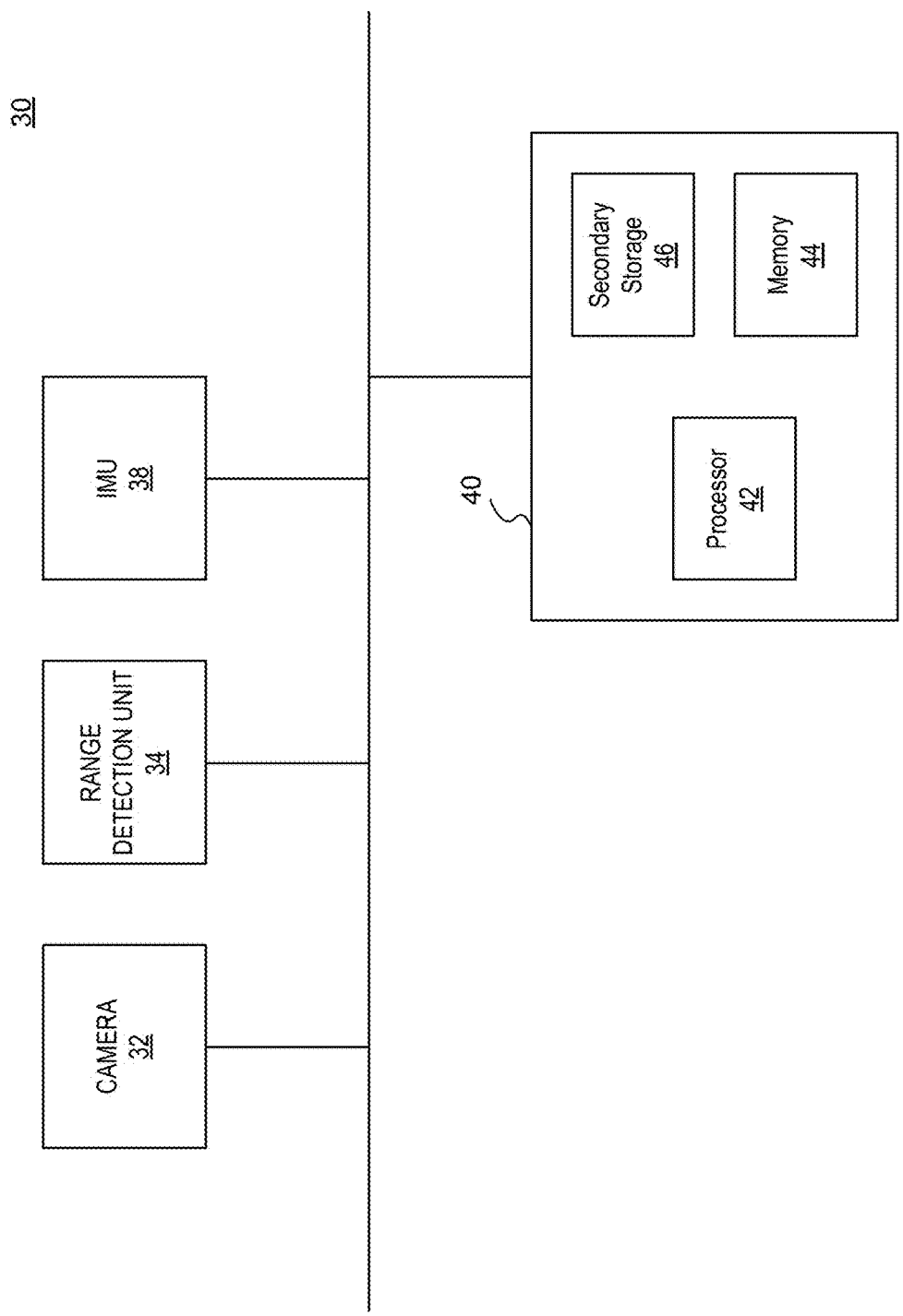
FIG. 2 is a diagrammatic illustration of the exemplary motion determination system of FIG. 1.

FIG. 2, in conjunction with FIG. 1, further describes an exemplary embodiment of motion determination system 30 that is capable of estimating an error associated with the visual-odometry outputs. Motion determination system 30 may include a camera 32, a LIDAR unit 34, an inertial measurement unit (IMU) 38, and controller 40. The above sensors and controller 40 may be connected to each other via a bus. In other embodiments, any suitable architecture may be used, including any combination of wired and/or wireless networks. Additionally, such networks may be integrated into any local area network, wide area network, and/or the Internet.

Camera 32 may be affixed to machine 10, for example, by being mounted to a body frame of machine 10. Camera 32 may be a mono camera or a stereo camera. Camera 32 may take optical images of worksite 12 at successive time points. In some embodiments, camera 32 has a field of view 33 that determines the content of the images. Field of view 33 may be based on the view-angle of a lens of camera 32 and the orientation of camera 32 as mounted on machine 10. As machine 10 moves about worksite 12, the portion of worksite 12 within field of view 33 that is captured as a camera image changes.

Range detection unit 34 (e.g., LIDAR unit 34 in the embodiments described herein) may obtain depth information for objects in its field of view and such depth information may be referred to as range data. In other embodiments, motion determination system 30 may include other range detection units to provide range information, such as other perception sensors (e.g., a sonar device and/or radar device). LIDAR unit 34 may include a plurality of light sources, such as lasers. Each laser may generate a laser beam, which is directed at various points of worksite 12. LIDAR unit 34 may further include one or more detector devices that receive the laser beams after reflection off of various points of worksite 12. Based on the time between generating the laser beam and receiving the reflected laser beam (referred to as time-of-flight measurements), motion determination system 30 may determine a distance to the corresponding point. In such a manner, motion determination system 30 may generate a 3D point cloud image representative of a part of worksite 12 that is detected by LIDAR unit 34. Each data point in this LIDAR image may include a distance from the LIDAR unit 34 to a detected point of worksite 12. This LIDAR image is in contrast with an optical camera image, in which each data point generally represents a color of the detected point. In an exemplary embodiment, LIDAR unit 34 may include sixty-four lasers, which may collectively obtain approximately one million points per LIDAR image. In other embodiments, LIDAR unit 34 may include more or less than sixty-four lasers and/or obtain more or less points per LIDAR image. In some embodiments, LIDAR unit 34 may generate a point cloud image that captures a full 360 degrees surrounding machine 10. In other embodiments, LIDAR unit 34 may capture 270 degrees of the surroundings of machine 10 (as shown in FIG. 1, as field of view 35), or any other amount of the surroundings.

IMU 38 may include one or more devices that provide measurements of angular position, rates, and/or acceleration. For example, IMU 38 may include a 6-degree of freedom IMU, which includes a 3-axis accelerometer, a 3-axis angular rate gyroscope, and/or a 2-axis inclinometer. The 3-axis accelerometer may provide signals indicative of the acceleration of machine 10 in an x-, y-, and z-axis direction. The 3-axis angular rate gyroscope may provide signals indicative of the pitch rate, yaw rate, and roll rate of machine 10. The 2-axis inclinometer may provide the pitch angle and the roll angle, for example. Measurements from IMU 38 may include a bias offset or a bias drift. Bias offset is a constant error offset component in the measurement. Bias drift is a dynamic error offset component in the measurement. In addition, data that is generated from integrating measurements from IMU 38 may include a random walk error due to noise. That is, each measurement may include some error due to noise, which is then compounded by the integration of measurements. Such error may be unbounded. In various embodiments, the bias offset, bias drift, and/or noise model of IMU 38 may be known, either by conducting device characterization measurements or by referring to the device specifications data.

Controller 40 may include a processor 41, a memory 42, and a secondary storage 43, and any other components for running an application. Processor 41 may include one or more known processing devices, such as a microprocessor. Memory 42 may include one or more storage devices configured to store information used by controller 40 to perform certain functions related to disclosed embodiments. Secondary storage 43 may store programs and/or other information, such as information related to processing data received from one or more components of motion determination system 30, as discussed in greater detail below. When processor 41 executes programs stored in secondary storage 43 and loaded into memory 42, controller 40 may process signals received from camera 32, LIDAR 34, and/or IMU 38 and determine the motion of machine 10 along with an error estimate for the visual-odometry outputs, based on the processed signals.

To better explain how controller 40 may determine an error estimate for the visual-odometry outputs, an exemplary motion determination algorithm is described that explains various visual-odometry concepts. In one example, camera 32 may capture an image of a scene within field of view 33. For example, controller 40 may obtain a first camera image and a second camera image of worksite 12 from camera 32.

The first camera image and second camera image may be obtained at successive points in time. For example, the first camera image may be obtained at an earlier time than the second camera image. During the time that elapses between when the first camera image is taken and when the second camera image is taken, machine 10 may be moving. Therefore, the first camera image and the second camera image may differ according to the motion of machine 10.

Controller 40 may preprocess and identify features in the first and second camera images. These features may be detected based on various predetermined discriminators that include, for example, color, brightness, or other characteristics of the images. The camera images may be preprocessed by, for example, removing that portion of the camera image that does not overlap with a corresponding 3D point cloud from LIDAR unit 34.

Controller 40 may match features to identify corresponding features in the first and second camera images. In one example, for a given pixel or group of pixels in a first camera image, controller 40 may determine attribute values, such as color or brightness, of neighboring pixels. Controller 40 may then identify a pixel or group of pixels in the second camera image with a set of neighboring pixels that match or correspond to those determined for the first camera image. Based on this identification, controller 40 may determine that the pixel or group of pixels in the first camera image and in the second camera image include corresponding features. In various other embodiments, controller 40 may perform other methods of identifying features and matching features between the first camera image and the second camera image, as known in the art.

LIDAR unit 34 may generate a first range image corresponding to the first camera image. As an example, the first range image may be in the form of a 3-dimensional (3D) point cloud where each point has a 3D position (X, Y, Z) with respect to the LIDAR unit 34. Controller 40 may fuse the first image from camera 32 and the first range image from LIDAR unit 34 to generate a first range map. A range map may be an image where a data point identifies a feature captured by the camera image and a range associated with that feature where the range may represent a distance, from camera 32, of that feature of worksite 12. To fuse a camera and corresponding range image, controller 40 may transform the 3D point cloud from LIDAR coordinates to camera coordinates to account for any position differences between LIDAR unit 34 and camera 32. Controller 40 may project the transformed 3D point cloud into a 2-dimensional (2D) camera image space of camera 32 taking into account the intrinsic camera calibration information (e.g., focal length and center of projection). If the 2D camera image space axes are designated by u, v, then each of the features identified in the camera image have a corresponding position (u, v). For example, if the camera resolution is 640×480, the camera image space may span 640×480 pixels with each pixel having a unique (u, v). By virtue of the projection of the 3D point cloud, each feature in the camera image space can be associated with a corresponding 3-D position (X, Y, Z) and a range '1' from camera 32. Accordingly, a range map may be generated using the above steps so that a given feature in the camera image space may have corresponding range or depth information. It is possible that a feature point in the camera image space may not exactly overlap with a projected 3D LIDAR point. In such a case, controller 40 may associate the closest projected 3D LIDAR point with the feature point so that the feature point now has a range associated with it. Fusing this information together may provide more useful information for motion estimation and for the site or machine operator.

Figure 3:
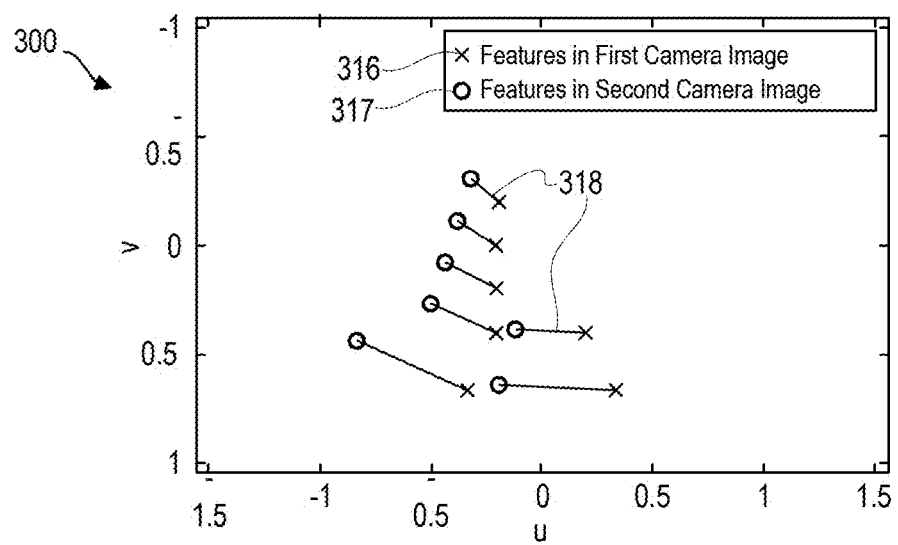
FIG. 3 illustrates exemplary feature matching between two camera images.

Controller 40 may determine machine motion by determining a change in feature positions between the first and second camera images. For example, controller 40 may determine the relative change in position of common features within the field of view of camera 32, as captured in the first camera image and the second camera image. Graph 300 in FIG. 3 shows features in the first camera image space, indicated by markers 316, and features in the second camera image space, indicated by markers 317. Corresponding features of the first camera image and the second camera image in the camera 32 image space are connected by lines 318. Utilizing the corresponding 3-D position (X, Y, Z) and a range '1' for one or more of these features, controller 40 may determine the translation and/or rotation of machine 10. Translation of machine 10 may correspond to a change in the position of machine 10 along x-, y-, and z-axes of camera 32. The rotation of machine 10 may correspond to a change in the machine position along the yaw, roll, and pitch directions.

To determine the translation and rotation, controller 40 may select a predetermined number of feature points to estimate a model for a rotation matrix and a translation vector that approximately describes a rotation and translation between the two camera images. For example, controller 40 may select three feature points randomly from the common features of the two camera images. In one embodiment, controller 40 may select the three feature points such that they are non-collinear and the distance between each pair of points is at least a certain number of meters away so that those points are not clustered in the same area. It will be understood that the number three is simply an example, and controller 40 may select more number of points (e.g., 4, 5, 8).

Based on the selected three feature points and using any well-known technique, controller 40 may determine an estimated rotation matrix R and a translation vector t for the three selected feature points. Controller 40 may determine inlier feature points using the estimated rotation matrix R and a translation vector t where inlier feature points refer to all the common feature points between the first and second camera images that fit the model estimated above. For example, consider a situation in which there are 200 common features in the first and second camera images. Now, if controller 40 estimates a model (e.g., a rotation matrix and a translation vector between the two camera images) and 160 features (and more particularly, corresponding feature points in the camera 32 image space) fit the model, then the 160 feature points are inlier feature points.

To determine the inlier feature points, controller 40 may reconstruct the feature points of the second camera image using the feature points of the first camera image and the estimated rotation matrix R and the translation vector t. For example, consider a first camera image with feature points a(1), b(1), c(1), d(1) and a second camera image with corresponding feature points a(2), b(2), c(2), and d(2). If the model was estimated using feature points a(1), b(1), c(1), a(2), b(2), c(2), then one can reconstruct each of three first camera image feature points using the three second camera image feature points. For example, a(2) can be reconstructed using a(1), the rotation matrix R, and the translation vector t. But controller 40 may or may not be able to accurately reconstruct d(2) accurately using d(1) because the model may not accurately capture the rotation and translation between d(1) and d(2). Therefore, to figure out whether d(2) is an inlier, controller 40 may determine a d(2)' using d(1), the rotation matrix R, and the translation vector t. If d(2)' is within a predetermined tolerance of d(2), then d(2) may be counted as an inlier. To determine whether d(2) is an inlier, controller 40 may determine whether:

$$|d(2)'-d(2)|<M \text{ pixels}$$

where M pixels is a predetermined tolerance.

Controller 40 may determine a final rotation matrix and translation vector using all or a portion of the inlier feature points. Based on the determined translation and/or rotation, controller 40 may determine, for example, 6 degrees of velocities of machine 10. For example, controller 40 may divide the translation and rotation by the elapsed time that occurred between the capture of the first camera image and the second camera image to obtain a rate of change, i.e. translation velocities, in the x, y, and z directions and rotation velocities in the yaw, roll, and pitch directions. In some embodiments, controller 40 may utilize more than two image frames (i.e., a third image, fourth image etc.), and average to reduce errors. Once controller 40 has determined the velocities of machine 10, controller 40 may utilize the velocities to determine the position of machine 10.

The above was a description of an exemplary calculation of visual-odometry outputs (e.g., rotation and translation velocities). Next, a detailed description is provided regarding exemplary techniques for calculating an error estimate associated with the visual-odometry outputs. FIGS. 4-8 depict flowcharts and diagrams illustrating exemplary methods for determining an error estimate associated with the visual-odometry outputs of machine 10 according to various disclosed embodiments. FIGS. 4-8 will be discussed in the following section to further illustrate the disclosed motion determination system and its operation.

INDUSTRIAL APPLICABILITY

The disclosed motion determination system 30 may be applicable to any machine, such as machine 10, for which motion determination is desired. The disclosed motion determination system 30 may provide for this need through the use of methods described herein, which may be performed by controller 40, for example. In various exemplary embodiments, motion determination system 30 may determine an error estimate associated with various visual-odometry outputs. The error estimates may allow the fusing of the visual-odometry outputs with outputs from other sensors, such as IMU 38, etc. By combining the various inputs, motion determination system 30 may provide a more accurate and/or more robust determination of the motion of machine. In some situations, a more accurate and/or robust determination of the motion of machine 10 may allow for more accurate positioning of machine 10. Furthermore, in some embodiments, because such determinations are more accurate and/or robust, machine 10 may be able to determine its position within worksite 12 for longer periods of time without relying on an absolute position measurement device, such as a Global Positioning System (GPS) device. Operation of motion determination system 30 will now be explained with respect the FIGS. 4-8.

Figure 4:
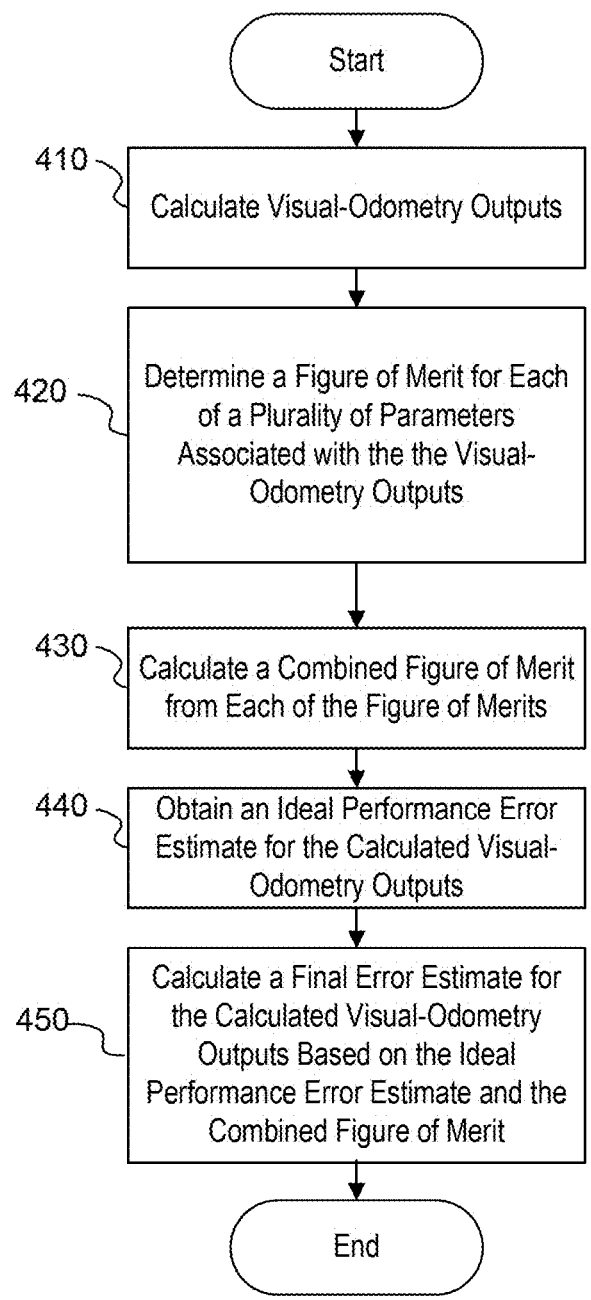
FIG. 4 is a flowchart depicting an exemplary disclosed method that may be performed by the motion determination system of FIG. 2.

FIG. 4 illustrates an exemplary algorithm for calculating an error estimate associated with visual-odometry outputs. In step 410, controller 40 may calculate visual-odometry outputs. For example, controller 40 may calculate the rotation and translation velocities for machine 10 using the techniques discussed in the previous section. In step 420, controller 40 may determine a figure of merit for each of a plurality of parameters associated with the calculated visual-odometry outputs. These parameters are indicators of the quality of the visual-odometry solution. For example, the plurality of parameters associated with the visual-odometry outputs may be the percentage of inlier feature points used for calculating the final rotation and translation matrices, the geometric distribution of inliers, etc. Each of these parameters and the associated figure of merit are discussed in detail next.

Figure 5:
FIGS. 5 and 6 illustrate figure of merit calculations for certain parameters.

As a first parameter, controller 40 may consider a range matching error. Range matching error may be defined as the average error (in number of pixels) between the feature points in the camera images and the associated range data. As discussed in the previous section, a feature point may be associated with range data obtained from the LIDAR unit. When the range data is projected to the camera image, the 3D LIDAR points may not exactly overlap with the feature points in the camera image. However, to ensure that each feature point has associated range information, controller 40 may associate a feature point with the closest 3D LIDAR point. The distance in pixels between the projected 3D LIDAR point and the feature point is an error and the average of all such errors for the relevant feature points in a camera image may provide the range matching error. Controller 40 may determine a figure of merit associated with the first parameter (e.g., range matching error). For example, controller 40 may determine that if the range matching error is 0 pixels, the figure of merit is 1; for all range matching errors 10 and above, the figure of merit is 1; and for all range matching errors between 0 and 10, the figure of merit varies linearly between 1 and 0. FIG. 5 illustrates an exemplary figure of merit calculation with the "average range error" denoting the range matching error. It will be understood that the range matching error limits (such as 0 pixels and 10 pixels) are exemplary and any suitable number may be selected for these limits.

Figure 6:
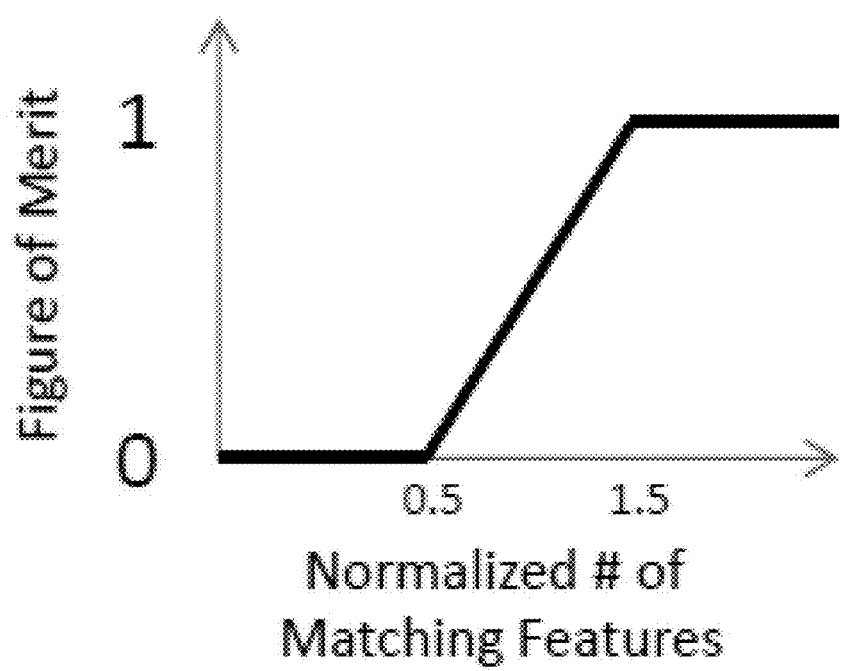

As a second parameter, controller 40 may consider the number of matching features or feature points between the camera images. A greater number of matching features may indicate a better visual-odometry solution. Controller 40 may obtain a normalized number of matching features based on the camera image resolution. For example, if the camera image resolution is 640×480, there would be 307,200 pixels per image. Accordingly, controller 40 may divide the number of matching features by 307,200 pixels per image and may further divide the resulting number by 1,000 pixels to obtain a normalized number of matching feature points, which may be the figure of merit. Based on the above, the normalized number of matching features between camera images may be 0.32 given 100 matching features, 0.65 given 200 matching features, 1.63 given 500 matching features, etc. Exemplarily, controller 40 may assign a figure of merit of 1 if the normalized number of features exceeds 1.5 and a figure of merit of 0 if the normalized number of features is less than 0.5. FIG. 6 illustrates an exemplary figure of merit calculation for the second parameter (e.g., number of matching features). It will be understood that the limits (such as 1.5 and 0.5) are exemplary and any suitable number may be selected for these limits.

As a third parameter, controller 40 may consider the percentage of inlier feature points. If there are 100 matching feature points between the camera images and only 10 are inliers, controller 40 may determine the inlier percentage as 10%. Exemplarily, controller 40 may assign a figure of merit of 0 if the inlier percentage is less than 10% and a figure of merit of 1 if the inlier percentage is greater than 90%. Between these two limits (10% and 90%), the figure of merit may vary linearly between 1 and 0. Again, it will be understood that these limits are simply examples.

As a fourth parameter, controller 40 may consider the inlier error. The inlier error may be defined as the average error (in number of pixels) between the rotated and translated feature points and the actual feature points in the second camera image that were counted as inliers. As discussed in the previous section, to determine whether a feature point d(2) in the second camera image is an inlier, controller 40 may determine a d(2)' using d(1), the rotation matrix R, and the translation vector t. If d(2)' is within a predetermined tolerance of d(2), then d(2) may be counted as an inlier. The distance in pixels between d(2)' and d(2) is an example of an inlier error, and the final inlier error value may be obtained by taking an average of the distance between the rotated and translated feature points and the actual feature points in the second camera image that were counted as inliers. Exemplarily, controller 40 may assign a figure of merit of 0 if the average inlier error is greater than 10 pixels and a figure of merit of 1 if the average inlier error is 0 pixels. Between these two limits (10 and 0 pixels), the figure of merit may vary linearly between 1 and 0. Again, it will be understood that these limits are simply examples.

As a fifth parameter, controller 40 may consider the geometric distribution of the inlier feature points. If the inlier feature points are clumped around a specific area or if they are along a line, it may indicate a less accurate visual-odometry solution. As one exemplary technique to determine the geometric distribution, controller 40 may determine the largest triangle that could be made by the inlier feature points. The size of the triangle formed may indicate the geometric distribution of the inlier feature points and based on the triangle size a figure of merit may be determined.

Figure 7:
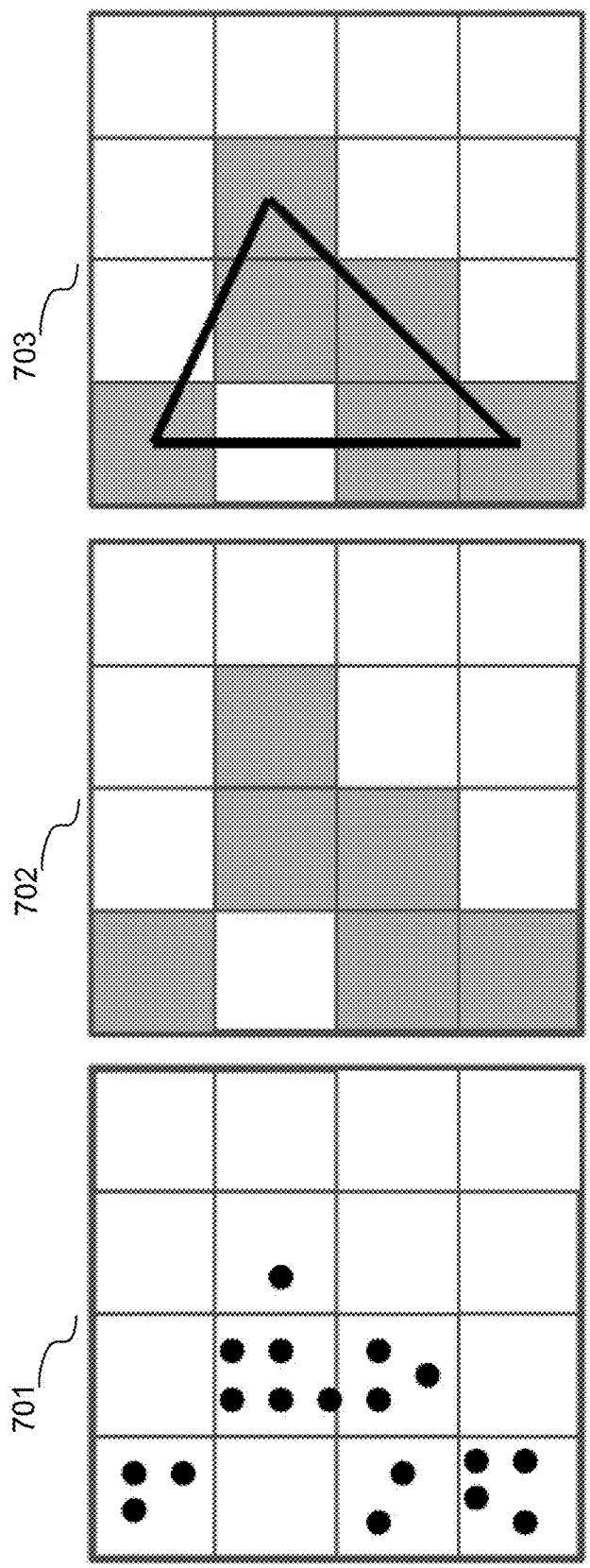
FIG. 7 illustrates a technique for calculating a figure of merit for a parameter indicative of the distribution of inlier feature points.

To illustrate this technique, consider image 701 having inlier feature points as shown in FIG. 7. As shown in FIG. 7, controller 40 may divide image 701 into various bins with each bin having bin coordinates denoted by the center pixel of a given bin. In FIG. 7, image 701 is divided into 16 bins but it will be understood that the number 16 is exemplary. Controller 40 may determine the bins have inlier feature points. In FIG. 7, image 702 has shaded bins indicating bins in image 701 that have inlier feature points. Controller 40 may determine two bins, from among all the shaded bins, which are furthest apart from each other. These two bins form the longest side of a triangle as show in image 703 in FIG. 7. Controller 40 may determine the bin that is furthest away from the end points of the long side of the triangle, which bin will provide the third point to complete the triangle. Once a triangle has been determined, the figure of merit may be calculated using one or more of the following two methods: area method and a modified GDOP (Geometric Dilution of Precision) calculation.

For the area method, the area of the triangle may be calculated using the following formula:

$$\text{Area} = \text{sqrt}(s(s-a)*(s-b)*(s-c)),$$

where a, b, and c are the lengths of the sides of the triangle and s is the triangle perimeter.

For the GDOP calculation, controller 40 may determine the matrix A using the following equation:

$$A = \begin{bmatrix} \frac{(x_1-x)}{R_1} & \frac{(y_1-y)}{R_1} & -1 \\ \frac{(x_2-x)}{R_2} & \frac{(y_2-y)}{R_2} & -1 \\ \frac{(x_3-x)}{R_3} & \frac{(y_3-y)}{R_3} & -1 \end{bmatrix}$$

where x, y are the coordinates of the center of the triangle, $(x_1, y_1)$, $(x_2, y_2)$, $(x_3, y_3)$ are the coordinates of the triangle end points, and $R_1$, $R_2$, $R_3$ may be calculated using the following formula:

$$R_1 = \sqrt{(x_1-x)^2 + (y_1-y)^2}$$

Using the matrix A, controller 40 may determine the value GDOP using the following equations:

$$Q = (A^T A)^{-1} = \begin{bmatrix} \sigma_x^2 & \sigma_{xy} & \sigma_{xt} \\ \sigma_{xy} & \sigma_y^2 & \sigma_{yt} \\ \sigma_{xt} & \sigma_{yt} & \sigma_t^2 \end{bmatrix}$$

$$PDOP = \sqrt{\sigma_x^2 + \sigma_y^2}$$

$$TDOP = \sqrt{\sigma_t^2}$$

$$GDOP = \sqrt{PDOP^2 + TDOP^2}$$

Using the area or the GDOP or a combination of both, controller 40 may determine a figure of merit. For example, controller 40 may assign a figure of merit as 0 if the area is less than 1 and a figure of merit of 1 if the area is greater than 8. Similarly, controller 40 may assign a figure of merit of 1 if the GDOP is 0 and a figure of merit of 0 if the GDOP is greater than 20. Between these limits, the figure of merit may vary linearly. Again, these limits are exemplary and may vary based on the system designer's preference, number of bins used, bin coordinate definitions, etc.

Back to the algorithm of FIG. 4, controller 40 may determine in step 430, a combined figure of merit based on each of the figure of merits for the different parameters. For example, controller 40 may multiply the figure of merits associated with the first, second, and third parameters. In another embodiment, controller 40 may multiply the figure of merits associated with all five parameters discussed above. The result of the multiplication may provide the combined figure of merit.

Figure 8:
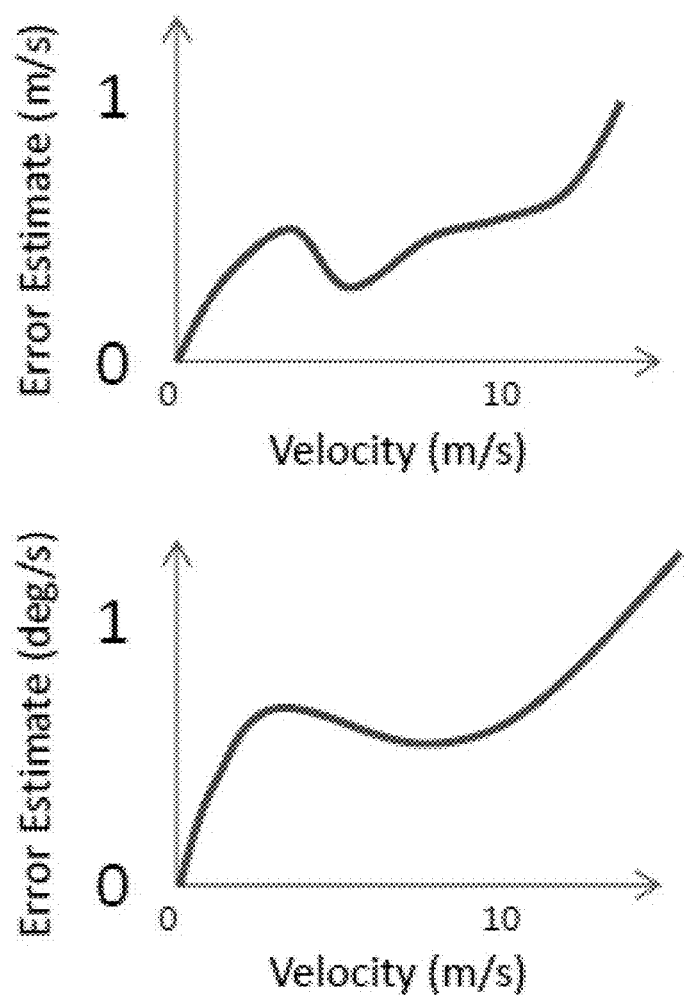
FIG. 8 illustrates ideal performance error estimates for rotation and translation velocities.

In step 440, controller 40 may obtain an ideal performance error estimate for the visual-odometry outputs calculated in step 410. Exemplarily, controller 40 may obtain this ideal performance error estimate from a lookup table. The ideal performance error estimate may be predetermined for the visual-odometry outputs (e.g., rotation and translation velocities) by comparing the visual-odometry outputs using outputs obtained by other means (e.g., GPS, IMU). For example, during a testing phase, the visual-odometry outputs may be compared to velocities obtained using GPS signals. Based on the difference between the visual-odometry outputs and the GPS velocities, an ideal performance error may be estimated for the visual-odometry outputs. FIG. 8 illustrates exemplary ideal performance error estimates for the visual-odometry outputs.

In step 450, controller 40 may calculate a final error estimate for the calculated visual-odometry outputs based on the ideal performance error estimates obtained in step 440 and the combined figure of merit obtained in step 430. For example, controller 40 may obtain the final error estimate by dividing the ideal performance error estimate with the combined figure of merit. As an example, if the ideal performance error estimate for the translation velocity is 0.1 m/s and the combined figure of merit is 0.539 for the translation velocity is 0.539, controller 40 may calculate the final error estimate for the translation velocity as 0.186 m/s.

Controller 40 may similarly calculate the final error estimate for other visual-odometry outputs (e.g., rotation velocity).

Accordingly, using the above techniques, machine motion may be determined by fusing image data from a camera unit and a LIDAR unit. The visual-odometry techniques described herein may provide six-degree velocity measurements and corresponding error estimates. The error estimates may allow the fusing of the visual-odometry outputs with outputs from other sensors (e.g., IMU 38), and ultimately allow for better motion determination. Furthermore, the above described techniques are also applicable to motion determination systems in which the visual-odometry system outputs are determined based on LIDAR data only, mono camera data only, or stereo camera data only.

It will be apparent to those skilled in the art that various modifications and variations can be made to the disclosed motion determination system. Other embodiments will be apparent to those skilled in the art from consideration of the specification and practice of the disclosed techniques. For example, the steps described need not be performed in the same sequence discussed or with the same degree of separation. Likewise, various steps may be omitted, repeated, or combined. It is intended that the specification and examples be considered as exemplary only, with a true scope being indicated by the following claims and their equivalents.

What is claimed is:

1. A motion determination system in a machine, comprising:
   one or more memories storing instructions; and
   a controller configured to execute the instructions to perform operations including:
      receiving, from a camera, a plurality of camera images representing an environment surrounding the machine;
      receiving, from a range sensor, range data representing the environment;
      identifying feature points in the plurality of camera images;
      associating the range data with the identified feature points to generate one or more visual-odometry outputs;
      determining a range matching error by computing an average error in a number of pixels between the feature points in the camera images and points in the camera images corresponding to the range data associated with the feature points;
      determining a plurality of figure of merits, wherein each of the plurality of figure of merits is associated with one of a plurality of parameters and is indicative of an accuracy of the visual-odometry outputs, the plurality of parameters affecting the generation of the one or more visual-odometry outputs and including at least the range matching error;
      calculating a combined figure of merit based on the plurality of figure of merits; and
      calculating an error estimate for the one or more visual-odometry outputs based on the combined figure of merit.

2. The system of claim 1, wherein the one or more visual-odometry outputs include a translation velocity and a rotation velocity.

3. The system of claim 1, wherein the plurality of parameters further include a number of matching feature points, a percentage of inlier feature points, an inlier error, and a geometric distribution of the inlier feature points.

4. The system of claim 1, wherein the combined figure of merit is calculated by multiplying each of the plurality of figure of merits.

5. The system of claim 1, wherein calculating the error estimate includes:
   obtaining a target performance-error estimate for the one or more visual-odometry outputs; and
   calculating the error estimate based on the obtained target performance-error estimate and the combined figure of merit.

6. The system of claim 5, wherein the error estimate is calculated by dividing the obtained target performance-error estimate with the combined figure of merit.

7. The system of claim 3, wherein
   the number of matching feature points is a number of common feature points between the plurality of camera images.

8. A computer-implemented method for determining motion of a machine, the method comprising:
   receiving, from a camera, a plurality of camera images representing an environment surrounding the machine;
   receiving, from a range sensor, range data representing the environment;
   identifying feature points in the plurality of camera images;
   associating the range data with the identified feature points to generate one or more visual-odometry outputs;
   determining a range matching error by computing an average error in a number of pixels between the feature points in the camera images and points in the camera images corresponding to the range data associated with the feature points;
   determining a plurality of figure of merits, wherein each of the plurality of figure of merits is associated with one of a plurality of parameters and is indicative of an accuracy of the visual-odometry outputs, the plurality of parameters affecting the generation of the one or more visual-odometry outputs and including at least the range matching error;
   calculating a combined figure of merit based on the plurality of figure of merits; and
   calculating an error estimate for the one or more visual-odometry outputs based on the combined figure of merit.

9. The method of claim 8, wherein the one or more visual-odometry outputs include a translation velocity and a rotation velocity.

10. The method of claim 8, wherein the plurality of parameters include a number of matching feature points, a percentage of inlier feature points, an inlier error, and a geometric distribution of the inlier feature points.

11. The method of claim 8, wherein the combined figure of merit is calculated by multiplying each of the plurality of figure of merits.

12. The method of claim 8, wherein calculating the error estimate includes:
   obtaining a target performance-error estimate for the one or more visual-odometry outputs; and
   calculating the error estimate based on the obtained target performance-error estimate and the combined figure of merit.

13. The method of claim 12, wherein the error estimate is calculated by dividing the obtained target performance-error estimate with the combined figure of merit.

14. The method of claim 10, wherein the number of matching feature points is a number of common feature points between the plurality of camera images.

15. A machine comprising:
a range sensor that generates range data representing an environment surrounding the machine;
a camera that generates camera images representing the environment; and
a controller including:
one or more memories storing instructions; and
a processor configured to execute the instructions to process the range data and the camera images to perform operations including:
receiving, from a camera, a plurality of camera images representing an environment surrounding the machine;
receiving, from a range sensor, range data representing the environment;
identifying feature points in the plurality of camera images;
associating the range data with the identified feature points to generate one or more visual-odometry outputs;
determining a range matching error by computing an average error in a number of pixels between the feature points in the camera images and points in the camera images corresponding to the range data associated with the feature points;
determining a plurality of figure of merits, wherein each of the plurality of figure of merits is associated with one of a plurality of parameters and is indicative of an accuracy of the visual-odometry outputs, the plurality of parameters affecting the generation of the one or more visual-odometry outputs and including at least the range matching error;
calculating a combined figure of merit based on the plurality of figure of merits; and
calculating an error estimate for the one or more visual-odometry outputs based on the combined figure of merit.

16. The machine of claim 15, wherein the one or more visual-odometry outputs include a translation velocity and a rotation velocity.

17. The machine of claim 15, wherein the plurality of parameters include a number of matching feature points, a percentage of inlier feature points, an inlier error, and a geometric distribution of the inlier feature points.

18. The machine of claim 15, wherein the combined figure of merit is calculated by multiplying each of the plurality of figure of merits.

19. The machine of claim 15, wherein calculating the error estimate includes:
obtaining a target performance-error estimate for the one or more visual-odometry outputs; and
calculating the error estimate based on the obtained target performance-error estimate and the combined figure of merit.

20. The machine of claim 19, wherein the error estimate is calculated by dividing the obtained target performance-error estimate with the combined figure of merit.

* * * * *